United States Patent
Benner

(10) Patent No.: US 7,823,824 B2
(45) Date of Patent: Nov. 2, 2010

(54) DEVICE FOR WINDING A SAFETY BELT

(75) Inventor: Markus Benner, Hardt (DE)

(73) Assignee: Hugo Kern und Liebers GmbH & Co. KG Platinen- und Federnfabrik, Schramberg (DE)

( * ) Notice: Subject to any disclaimer, the term of this patent is extended or adjusted under 35 U.S.C. 154(b) by 502 days.

(21) Appl. No.: 11/785,811

(22) Filed: Apr. 20, 2007

(65) Prior Publication Data

US 2008/0105778 A1     May 8, 2008

(30) Foreign Application Priority Data

Nov. 2, 2006   (DE) ................. 10 2006 052 167

(51) Int. Cl.
    *B60R 22/44* (2006.01)
(52) U.S. Cl. .................... 242/372; 242/375.1
(58) Field of Classification Search ............. 242/382.1, 242/382.2, 375.2, 385, 377, 379.2, 382, 382.5, 242/378.2, 385.1, 383, 383.1, 383.3, 383.2, 242/372, 375.1, 375.3, 375; 280/807; 297/475–478
See application file for complete search history.

(56) References Cited

U.S. PATENT DOCUMENTS

| | | | | |
|---|---|---|---|---|
| 2,953,315 A | * | 9/1960 | Lautier et al. ............... | 242/373 |
| 3,430,885 A | * | 3/1969 | Holmberg ................. | 242/383.5 |
| 4,453,681 A | * | 6/1984 | Gueguen et al. ............ | 242/376 |
| 4,531,687 A | * | 7/1985 | Andersson ............... | 242/383.5 |
| 4,741,491 A | * | 5/1988 | Andersson et al. .......... | 242/383 |
| 4,993,657 A | * | 2/1991 | Brown ....................... | 242/372 |
| 5,195,693 A | * | 3/1993 | Sasaki et al. ................ | 242/372 |
| 5,297,752 A | * | 3/1994 | Brown et al. .............. | 242/375.3 |
| 6,149,093 A | * | 11/2000 | Kwag ......................... | 242/372 |
| 6,152,393 A | * | 11/2000 | Ando et al. ............... | 242/382.2 |
| 6,431,485 B2 | * | 8/2002 | Mitsuo et al. ............... | 242/372 |
| 6,682,009 B1 | * | 1/2004 | Frank ....................... | 242/379.1 |

* cited by examiner

*Primary Examiner*—John Q Nguyen
*Assistant Examiner*—Scott Haugland
(74) *Attorney, Agent, or Firm*—The Nath Law Group; Jerald L. Meyer; Stanley N. Protigal

(57) ABSTRACT

Device for winding a safety belt onto a shaft, with a principle mainspring (7), which prestresses the shaft (4) in the winding direction (a) of the safety belt (2); a ratchet wheel (12) that rotates relative to the shaft (4); a blocking device (15) for blocking the rotational movement of the ratchet wheel (12) in the winding direction (a); a balance spring (20) which transmits to the shaft (4) a prestressing force that opposes the prestressing force of the principle mainspring (7) when the ratchet wheel (12) is blocked; and a free-wheel clutch that exhibits a blocking ring (34) with teeth (35, 39) and a blocking element that interacts with said teeth (35, 39). The blocking element has two ends having an angular spacing which differs from a whole-number multiple of the divisional spacing of the teeth (35, 39).

8 Claims, 3 Drawing Sheets

DEVICE FOR WINDING A SAFETY BELT

Figure 1:
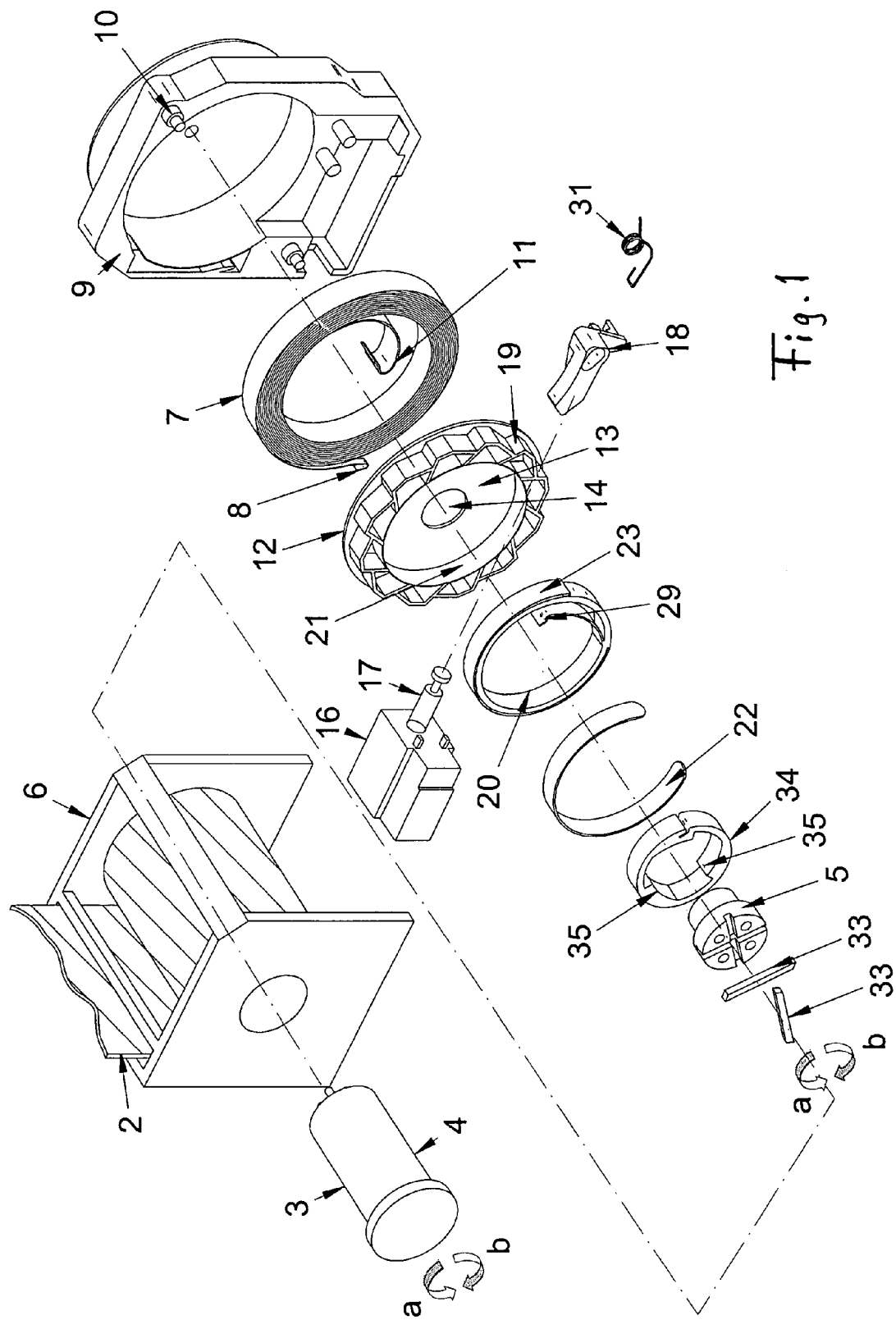

The invention relates to a device for winding a safety belt onto a shaft, with a principal mainspring which prestresses the shaft in the winding direction of the safety belt.

A device of this type for winding a safety belt is known from DE 10 2005 017 367 A1. Provided in this known device is a principal mainspring, which prestresses a shaft in the winding direction, where the shaft exhibits a segment for winding the belt. A balance spring counteracts this principal mainspring. The outer end of the balance spring interacts with a ratchet wheel, while the inner end of the balance spring interacts with the shaft by way of a free-wheel clutch. When the buckle of the safety belt is locked into place the ratchet wheel is blocked in the winding direction by a blocking device. This provides a comfort effect for the person using the safety belt. When locked into place the belt rests with only a slight degree pressure on the user's body, whereas the full torque of the principal mainspring is available for reliably winding the belt when the belt buckle is disengaged.

When the ratchet wheel is blocked and the shaft rotates in the winding direction, the free-wheel clutch brings about a transmission of force from the shaft to the balance spring, so that this balance spring is tightened and the torque required for this counteracts the torque of the principal mainspring. On the other hand, the free-wheel clutch permits the balance spring to turn in the winding direction, relative to the shaft. When the ratchet wheel is unblocked upon disengagement of the belt buckle, the ratchet wheel rotates in the winding direction due to the action of the prestressed balance spring. Since the free-wheel clutch permits the balance spring to rotate in this direction, relative to the shaft, there is no abrupt braking of the ratchet wheel when the balance spring is fully decompressed.

In the known belt-winding device the free-wheel clutch provides a driving mechanism that is positioned in torque-proof fashion on the shaft. The teeth of this driving mechanism form a ratchet wheel that interacts with the inner end of the balance spring. Given the elasticity of the balance spring, this inner end engages in a form-fitting manner with the toothing of the driving mechanism when the shaft turns in the winding direction relative to the balance spring. During the relative rotation in the opposite direction the elastic inner end jumps over the teeth of the driving mechanism in sliding fashion. The design of the inner end of the balance spring as an elastic catch advantageously provides a frictional braking of the balance spring, and thus of the ratchet wheel interacting with it, when the belt buckle is opened. At the same time, the inner end of the balance spring moves elastically each time a tooth of the driving mechanism jumps, and this results in a material load on the balance spring at its inner end.

The invention is based on the problem of providing a device of the initially described type, in which the free-wheel clutch is exposed to a low material load.

This problem is solved by a device for winding a safety belt, with a principal mainspring which prestresses the shaft in a winding direction of the safety belt, a ratchet wheel that rotates relative to the shaft, with a blocking device for blocking the rotational movement of the ratchet wheel in the winding direction, a balance spring. A prestressing force that opposes the prestressing force of the principal mainspring when the ratchet wheel is blocked is transmitted to the shaft. A free-wheel clutch both permits the transmission of force from the shaft to the balance spring in the winding direction when the ratchet wheel is blocked and allows a rotational movement of the balance spring relative to the shaft in the winding direction when the ratchet wheel is not blocked, such that the free-wheel clutch exhibits a blocking ring, the blocking ring having teeth and a blocking element that interacts with the teeth. The blocking element and its two opposite ends interact with the teeth of the blocking ring. The two ends of the blocking element have a angular spacing, along the circumference of the blocking ring, which differs from a whole-number multiple of the divisional spacing of the teeth. The blocking element is so mounted that one end of the blocking element dips between two of the teeth of the blocking ring at the same time as the opposite end of the blocking element comes into contact with one of the teeth. The blocking ring coaxially encompasses a drive segment of the shaft, the inner end of the balance spring is rotationally secured to the outer circumference of the blocking ring.

As provided by the invention, the free-wheel clutch takes the form of a toothed locking mechanism, which consists of a blocking ring and at least one blocking element that interacts with this blocking ring. The blocking ring is either firmly attached to the inside end of the balance spring or to the shaft, while the blocking element, conversely, is either mounted to the shaft or to the inside end of the balance spring. The blocking element (one or more) is so designed and positioned that each of its two opposite ends interacts with teeth of the blocking ring at an angular spacing which differs from a whole-number divisional spacing of the teeth. The blocking elements(s) are movably mounted. Due to the design and positioning of the blocking element and the blocking ring, any given tooth of the blocking ring works on one end of the blocking ring with its ridge section and thereby moves the other end of this blocking element into a trough of the tooth. In one direction of the relative rotation executed by the blocking ring and blocking element, the ends of the blocking element can therefore jump over the teeth of the blocking ring, consistent with the fact that one end of the blocking element passes over the rising the ridge of the corresponding tooth, while the other end yields and moves into a trough between the teeth. A free-wheel effect is thus permitted in this rotational direction. In the opposite rotational direction, the end of the blocking element positioned in the tooth trough of the blocking ring necessarily strikes the steep front of the next tooth, with the result that the free-wheel clutch is frictionally engaged in this direction and the shaft entrains the inner end of the balance spring.

One blocking element alone is enough to provide the free-wheel and entrainment function. A preferred embodiment provides for two blocking elements, which are set at an angle that differs from the angular spacing of the teeth of the blocking ring. This means that the minimum degree of rotation needed for a frictional engagement of the free-wheel clutch is reduced.

In one embodiment the inner end of the balance spring is firmly connected to the blocking ring, and this blocking ring is provided with an inner toothing. The blocking elements take the form of a straight locking pin, which is diametrically mounted in the shaft and can move freely in diametric, linear fashion.

In another embodiment the blocking ring is positioned on the shaft in torque-proof fashion and is provided with an external toothing. The inner end of the balance spring is firmly attached to a circular retainer. The blocking element (one or more), which takes the form of a blocking anchor that swivels freely, is mounted on the inner circumference of this retainer.

The invention will next be described in greater detail on the basis of exemplary embodiments which are shown in the drawing. Depicted are:

FIG. 1 an exploded view of the belt winding device, in an initial embodiment

Figure 2:
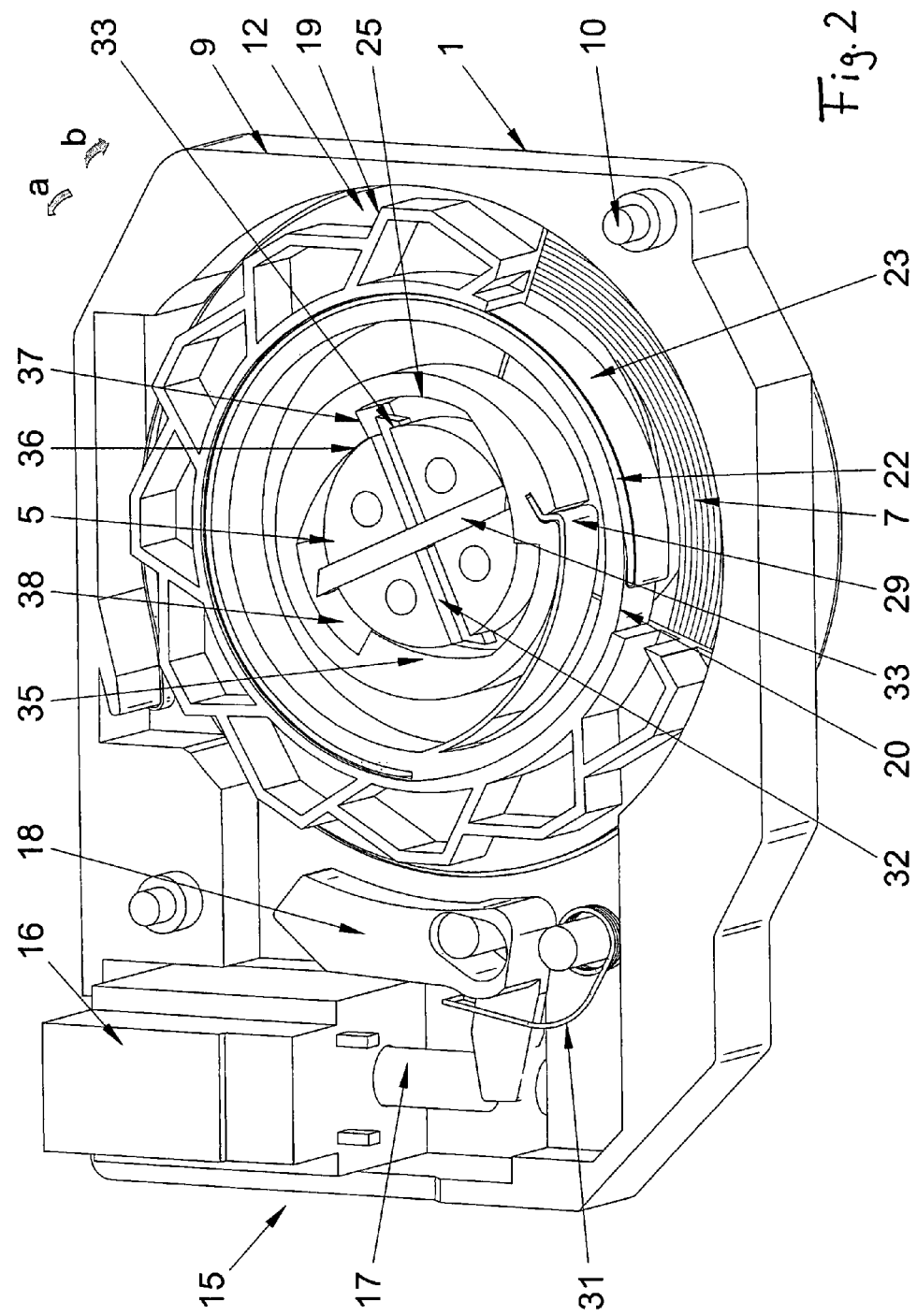

FIG. 2 a perspective front view of this belt winding device in assembled state

Figure 3:
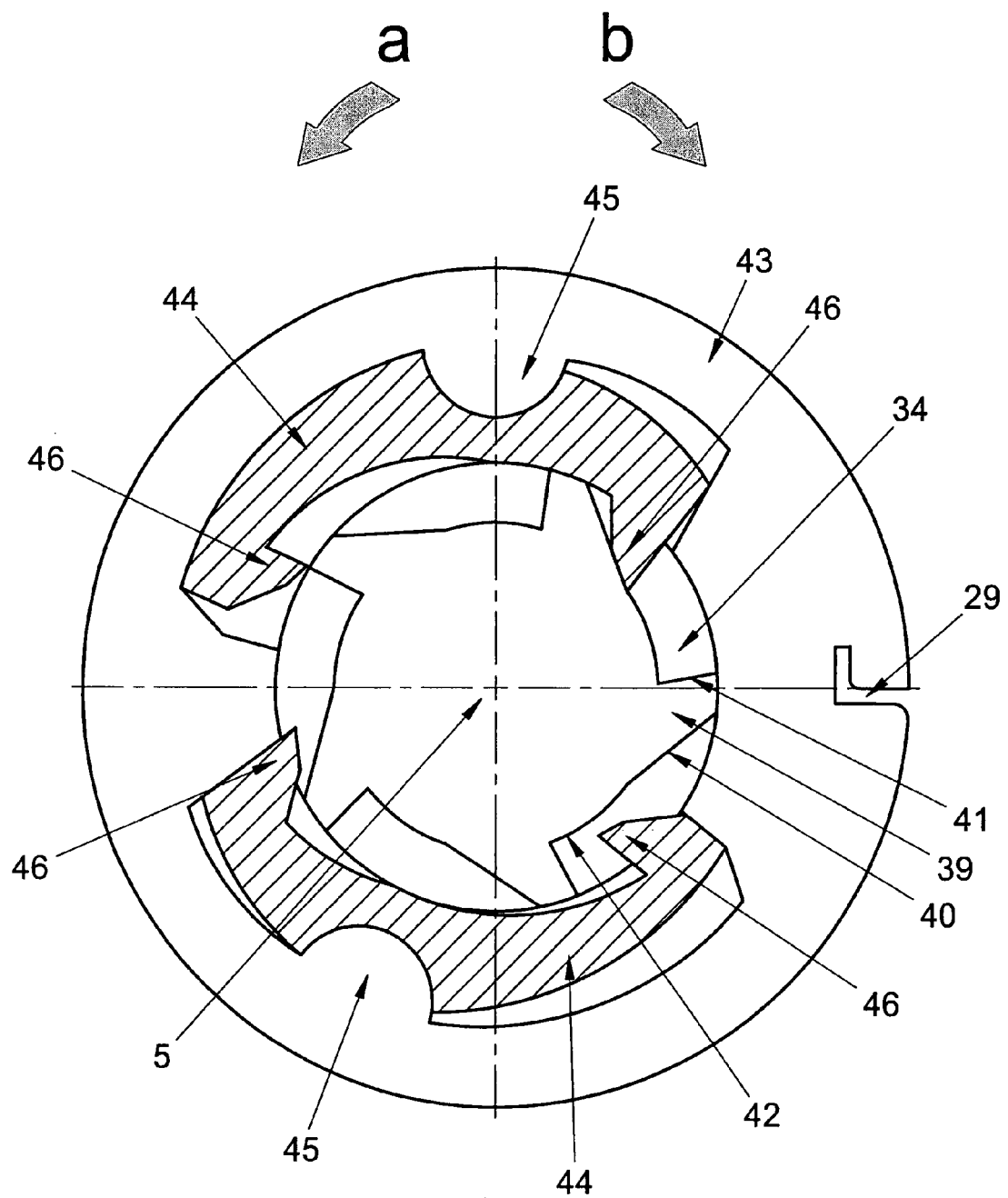

FIG. 3 a second embodiment of the free-wheel clutch.

A belt winding device is depicted in the drawing. By means of the belt winding device 1 a safety belt 2 can be wound onto the belt-winding segment 3 of a shaft 4. The shaft 4 has a two-part design and consists of a belt-winding segment 3 and a drive segment 5 affixed to the latter in non-rotating fashion. The shaft 4 is mounted in a belt housing 6 in a manner that permits the shaft 4 to rotate.

A principal mainspring 7 is firmly connected by its outside end 8 to a plastic housing 9. The plastic housing 9 is attached by a pin 10 to the side of the belt housing 6. The principal mainspring 7 is attached by its inner end 11 to the drive segment 5 of the shaft 4 in torque-proof fashion. As a result, when the shaft 4 rotates in the unwinding direction 'b'—that is, when the belt 2 is pulled out—the principal mainspring 7 is tightened in the winding direction 'a'.

The belt winding device 1 also includes a ratchet wheel 12, which lies axially adjacent to the principal mainspring 7 and is coaxially positioned relative to the drive segment 5 of the shaft 4. The ratchet wheel 12 can freely rotate relative to said drive segment 5 of the shaft 4. For reasons of stability a disk 13 that forms a single piece with the ratchet wheel 12 is provided on the side of the ratchet wheel 12 that faces the principal mainspring 7. The disk 13 exhibits a central through-hole 14 for the drive segment 5 of the shaft 4. Assigned to the ratchet wheel 12 is a blocking device 15, which exhibits a magnetic actuator 16 with an actuating tappet 17, as well as a swivel-mounted catch 18 that is prestressed by a spring 31. The catch 18 interacts with teeth provided on the outer circumference of the ratchet wheel 12. The blocking device 15 serves to block the rotation of the ratchet wheel 12 in the winding direction 'a'. Rotation of the ratchet wheel 12 in the unwinding direction 'b' is possible at any time. Operating under the effect of the spring 31, the catch 18 then jumps over the toothing 19 of the ratchet wheel 12.

Positioned within the ratchet wheel 12 is a balance spring 20 that is also designed as is a mainspring. With its outer winding the balance spring 20 rests with a frictional connection against the inner circumference 21 of the ratchet wheel 12. To increase the pressure of the balance spring 20 on the inner circumference 21 of the ratchet wheel 12, a spreader spring 22, designed as a circumferential spring element, is positioned inside the outer winding of the balance spring 20 and presses the outer winding of the balance spring 20 against the inner circumference 21 of the ratchet wheel 12. The outer end 23 of the balance spring 20 is bent inward in the shape of a hook. This allows the spreader spring 22 to be held in its circumferential position relative to the balance spring 20. The transmission of force between the balance spring 20 and the ratchet wheel 12 is frictional both in the winding direction 'a' and the unwinding direction 'b', so that the balance spring 20 and the inner circumference 21 of the ratchet wheel 12 form a sliding clutch.

Positioned inside the balance spring 20 is a free-wheel clutch, which is operative between the balance spring 20 and the drive segment 5 of the shaft 4. When the shaft 4 rotates in the winding direction 'a' relative to the balance spring 20, the free-wheel clutch produces a form-fitting engagement between the shaft 4 and the inner end 29 of the balance spring 20. The shaft 4 entrains the inner end 29 of the balance spring 20 and tightens the balance spring 20, so that the latter exerts a rotational stressing force on the drive segment 5 of the shaft 4 in the unwinding direction 'b'. Conversely, the free-wheel clutch permits the relative rotation of the inner end 29 of the balance spring 20 relative to the drive segment 5 of the shaft 4 in the winding direction 'a'.

The functioning of the belt winding device 1 is described immediately below. A detailed description of the free-wheel clutch then follows.

The primary mainspring 7 is connected in torque-proof fashion to the drive segment 5 of the shaft 4 and with the plastic housing 9, so that when the safety belt 2 is pulled out a stressing force in the winding direction 'a' is always exerted on the drive segment 5 of the shaft. When the safety belt 2 is positioned on the user the ratchet wheel 12 can turn freely in the winding direction 'a' until the belt buckle (not shown) is engaged. When the belt buckle is engaged the magnetic actuator 16 is activated, with the result that the actuating tappet 17 is retracted. This allows the catch 18 coupled to the actuating tappet 17 to be swiveled into its blocking position by the spring 31. In this blocking position the catch 18 has a frictional connection with the steep front of the tooth 19 belonging to the ratchet wheel 12 and thereby prevents the ratchet wheel 12 from turning in the winding direction 'a'. The ratchet wheel 12 is then able to rotate only in the unwinding direction 'b', in the process of which the catch 18 slides over the teeth 18 of the ratchet wheel 12.

When the safety belt positioned on the user is rolled up—i.e., when the shaft 4 is turned in the winding direction 'a' by the force of the principal mainspring 7—the free-wheel clutch is engaged, with the result that the shaft 4 entrains the inner end 29 of the balance spring 20 and the balance spring 20 is wound while the ratchet wheel 12 is blocked. In the process, the torque required to wind the balance spring 20 acts against the torque of the principal mainspring 7, so that the torque of the principal mainspring 7 is reduced in the amount of the torque required to wind the balance spring 20. Only this reduced torque works on the shaft 4 and thus on the safety belt 2 in the winding direction 'a', with the result that the degree of comfort desired by the person wearing the belt is achieved.

When the ratchet wheel 12 is blocked and the functional range of the balance spring 20 is exceeded—i.e., when the revolutions of the shaft 4 required to wind up the safety belt exceed the maximum total number of revolutions possible for the balance spring 20—the balance spring 20 can slide in the winding direction 'a' on the inner circumference 21 of the blocked ratchet wheel 12. Thus the shaft 4 can continue to turn in the winding direction 'a' until the safety belt 2 rests against the body of the person wearing it.

When the belt buckle is opened the actuating tappet 17 of the magnetic actuator 16 is extended, with the result that the catch 18 is swung out of its blocking position, against the action of the spring 31, and out of the toothing 19 of the ratchet wheel 12. Driven by the torque of the balance spring 20, the ratchet wheel 12 then begins to turn in the winding direction 'a', while at the same time the balance spring 20 relaxes. The ratchet wheel 12 turns at a high speed in the winding direction 'a'. The free-wheel clutch becomes disengaged at the latest when the balance spring 20 is fully relaxed, and the ratchet wheel 12 can continue to turn freely until reaching a complete standstill. The safety belt 2 is wound on to the winding segment 3 of the shaft 4 by the full torque of the principal mainspring 7, and in this process the ratchet wheel 12 is in an unblocked state.

In the exemplary embodiment depicted in FIGS. 1 and 2 the free-wheel clutch is designed in the following manner.

Two guide grooves 32 are formed in the face of the drive segment 5 belonging to the shaft 4. The guide grooves 32 extend diametrically over the entire diameter of the drive segment 5 and intersect at a right angle in the center of the drive segment 5. Positioned in each of the guide grooves 32 is a blocking element that takes the form of a linear locking pin 33. The length of the locking pins 33 is somewhat greater than the diameter of the drive segment 5. The locking pins 33 are mounted so as to glide freely in the guide grooves 32 and are thus able to move diametrically in said guide grooves 32. One of the guide grooves 32 has a deeper profile than the other, with the result that the locking pins 33 mounted in these guide grooves 32 are able to intersect without hindering each other's mobility.

The drive segment 5 is coaxially encompassed by a blocking ring 34. The inside end 29 of the balance spring 20 is suspended in torque-proof fashion in the outer circumference of the blocking ring 34. The blocking ring 34 has an inner toothing with which the ends of the locking pins 33 interact. The inner toothing of the blocking ring 34 has an odd number of teeth 35, and these teeth 35 are positioned with a uniform angular spacing. In the depicted exemplary embodiment, three teeth 35 are provided, which are positioned at angle of 120° relative to each other. Each of the teeth 35 has a back or ridge 36 that gradually rises in the direction of rotation and a front 37 that drops steeply toward the radius. There is a trough 38 between the front 37 of a given tooth 35 and the beginning of the rising ridge 36 of the next tooth 35. The trough 38 has a basically constant diameter. Due to the odd number of teeth 35, a trough 38 is in each case positioned diametrically opposite the rising ridge 36 of the tooth 35.

When the shaft 4 turns in the winding direction 'a', one of the locking pins 33 strikes the front 37 of the next tooth 35 in form-fitting fashion with its end that projects over the circumference of the drive segment 5, with the result that the drive segment 5 draws along the blocking ring 34 and thus the inner end 29 of the balance spring 20. Since the front 37 of the tooth 35 basically runs in radial fashion relative to the axis of the drive segment 5, the locking pin 33 is maintained in its position against this tooth front 37 and is not pushed into the drive segment by the this tooth front 37. Since two locking pins 33 are provided, the rotational angle of the drive segment is cut in half, after which, at the latest, one of the locking pins 33 strikes a tooth 35 and the free-wheel clutch is engaged, entraining the blocking ring 34 and the balance spring 20.

When the shaft 4 turns with the drive segment 5 in the unwinding direction 'b', relative to the blocking ring 34, (which occurs upon retraction of the safety belt 2) or when the blocking ring 34 turns in the winding direction 'a', relative to the drive segment 5, (which occurs when the belt buckle is disengaged and the ratchet wheel is released), then the ends of the locking pin 33, which protrude radially beyond the circumference of the drive segment 5, in each case run along the rising ridge 36 of a tooth 35. In the process, this tooth ridge 36 presses the projecting, first end of the given locking pin 33 radially inward into its guide groove 32, with the result that the opposite, second end of this locking pin 33, on the diametrically opposite side, is pushed beyond the circumference of the drive segment 5. Since a trough 38 is always located on this diametrically opposite side of the tooth ridge 36, the second end of the locking pin 33 can pass unopposed beyond the circumference of the drive segment 5. In the course of further rotation, this second end of the locking pin 33 then comes into contact with the rising ridge 36 of the next tooth 35 and is again pushed inside the circumference of the drive segment 5 by this tooth ridge 36. This is possible since, with continued rotation, the first end of the locking pin 33 has been moved in the meantime over the tooth ridge 36 and has reached the area of a tooth trough 38. For rotation of this kind—when the shaft 4 rotates in the unwinding direction 'b' relative to the blocking ring 34 or when the blocking ring rotates in the winding direction 'a' relative to the shaft 4—there is consequently a free-wheel effect, inasmuch as the teeth 35 push the locking pins 33 back and forth diametrically within the guide grooves 32, without obstructing the process of rotation.

The entraining effect for a relative rotational direction and the free-wheel effect for the opposite relative rotational direction are thereby reliably insured, without the locking pins 33 being subjected to a spring action.

FIG. 3 depicts an alternative embodiment of the free-wheel clutch.

In this embodiment the outer circumference of the drive segment 5 is designed as a blocking ring with an outer toothing. The outer toothing consists of teeth 39 positioned with a uniform angular spacing, such that each of the teeth exhibits a ridge 40 that gradually rises in the direction of rotation and a front 41 that falls sharply in the opposite rotational direction. Formed between the sharply falling front 41 of a tooth 39 and the beginning of the rising ridge 40 of the following tooth 39 is a trough 42, which has a basically constant diameter.

The drive segment 5 with the outer toothing is coaxially surrounded by a concentric, circular retainer 43, in whose outer circumference the inner end 29 of the balance spring 20 is anchored in torque-proof fashion. Positioned on the inner circumference of the retainer 43 are two blocking elements, which take the form of blocking anchors 44. The blocking anchors 44 basically run in the circumferential direction of the drive segment 5 and are swivel-mounted at their centers on a bearing pin 45. The bearing pins 45 are formed onto the inner circumference of the retainer 43 and run in axially parallel fashion to the shaft 4 or, as the case may be, the retainer 43. The blocking anchors 44 are mounted on the axis of the bearing pins 45 in a way that permits them to freely swivel. At both of their ends the blocking anchors 44 exhibit a projection 46 that is oriented in the direction of the toothing. The dimensions of the blocking anchors 44 in the circumferential direction, and the corresponding arrangement of the projections 46 at the ends of the blocking anchors 44, are such that the angular spacing of the projections 46 differs from a whole-number multiple of the divisional spacing of the teeth 39. In the depicted embodiment the angular spacing of the projections 46 of one blocking anchor 44 equals roughly 1.5 times the divisional spacing of the teeth 39.

The arrangement and design of the blocking anchors 44 and of the projections 46 are chosen so that for the two extreme swivel positions occupied by the blocking anchors 44 one of the projections 46 is entirely inserted into a tooth trough 42, while the opposite projection 46 is completely lifted above the maximum radial distance of the tooth ridge 40. The angular placement of blocking anchors 44 is such that they engage with the teeth 39 in different angular positions.

When the shaft 4, with the drive segment 5, turns in the winding direction 'a' relative to the retainer 43 and the balance spring 20, one of the teeth 39 strikes a projection 46 of a blocking anchor 44 with its front 41. Since the tooth front 41; drops steeply in the radial direction and the corresponding contact surface of the projection 46 has a matching design a form-fit is provided between the tooth 39 and the blocking anchor 44, with the result that the shaft 4 entrains the retainer 43 and thus the inner end 29 of the balance spring 20. The free-wheel clutch is thus engaged. When the belt is wound up the balance spring 20 is consequently tightened and the comfort effect is achieved. On the other hand, when—upon unwinding of the belt—the shaft 4 and the drive segment 5 rotate in the unwinding direction 'b' relative to the retainer 43, or when—upon disengagement of the belt buckle—the ratchet wheel 12 is released and the balance spring 20 turns the retainer 43 in the winding direction 'a' relative to the shaft 4 and to the drive section 5, then the blocking anchors 44, along with one of their projections 46, run upwards onto the ridge 40 of the teeth 39—a circumstance made possible by the fact that the other projection 46 is swung into a tooth trough 42 in the process. When the other projection 46 of the given blocking anchor 44 reaches the ridge 40 of the next tooth 39 in the course of further rotation, the first projection 46 has passed over the tooth 39 in the meantime and can now, for its own part, be swung into a tooth trough 42. The free-wheel clutch operates as a free-wheel in this direction of relative rotation.

In this embodiment also the blocking elements formed by the blocking anchors 44 are subjected to forced movement, so that their two ends are alternately engaged without the need for an elastic load on said blocking elements.

LIST OF REFERENCE NUMERALS

1 belt winding device
2 safety belt
3 winding segment
4 shaft
5 drive segment
6 belt housing
7 principle mainspring
8 outer end
9 plastic housing
10 pin
11 inner end
12 ratchet wheel
13 disk
14 through-hole
15 blocking device
16 magnetic actuator
17 actuating tappet
18 catch
19 teeth
20 balance spring
21 inner circumference
22 spreader spring
23 outer end
29 inner end
31 spring
32 guide grooves
33 locking pin
34 blocking ring
35 teeth
36 ridge of tooth
37 front of tooth
38 trough of tooth
39 teeth
40 ridge of tooth
41 front of tooth
42 trough of tooth
43 retainer
44 blocking anchor
45 mounting pin
46 stay projection
a winding direction
b unwinding direction

The invention claimed is:

1. Device for winding a safety belt onto a shaft, comprising:
    a principal mainspring which prestresses the shaft in a winding direction of the safety belt;
    a ratchet wheel that rotates relative to the shaft, with a blocking device for blocking the rotational movement of the ratchet wheel in the winding direction;
    a balance spring, which transmits to the shaft a prestressing force that opposes the prestressing force of the principal mainspring when the ratchet wheel is blocked; and
    a free-wheel clutch, which both permits the transmission of force from the shaft to the balance spring in the winding direction when the ratchet wheel is blocked and allows a rotational movement of the balance spring relative to the shaft in the winding direction when the ratchet wheel is not blocked, such that the free-wheel clutch exhibits a blocking ring, the blocking ring having inner teeth and at least one blocking element that interacts with said teeth,
    wherein
    at least one of the blocking elements and its two opposite ends interact with the teeth of the blocking ring, the two ends of the blocking element have a angular spacing, along the circumference of the blocking ring, which differs from a whole-number multiple of the divisional spacing of the teeth, and the blocking element is so mounted that one end of the blocking element dips between two of the teeth of the blocking ring at the same time as the opposite end of the blocking element comes into contact with one of the teeth,
    and wherein
    the blocking ring coaxially encompasses a drive segment of the shaft, the inner end of the balance spring is rotationally secured to the outer circumference of the blocking ring, and the one or more blocking elements each take the form of a straight locking pin, which is mounted in the drive segment in a way that permits said locking pin to move diametrically and whose length exceeds the diameter of the drive segment.

2. Device according to claim 1, wherein
the one or more blocking elements comprise two blocking elements positioned in the circumferential direction of the blocking ring, with an angular spacing that differs from a whole-number multiple of the tooth spacing on the blocking ring.

3. Device according to claim 2, wherein
the one or more blocking elements comprise two locking pins guided so as to intersect in the drive segment of the shaft on planes that are axially distinct from each other.

4. Device according to claim 2, wherein
each tooth of the blocking ring exhibits a ridge that rises gradually in one rotational direction and a front that drops steeply toward the radius in the other direction.

5. Device according to claim 1, wherein
the one or more blocking elements comprise two locking pins guided so as to intersect in the drive segment of the shaft on planes that are axially distinct from each other.

6. Device according to claim 5, wherein
each tooth of the blocking ring exhibits a ridge that rises gradually in one rotational direction and a front that drops steeply toward the radius in the other direction.

7. Device according to claim 1, wherein
each of the teeth of the blocking ring exhibits a ridge that rises gradually in one rotational direction and a front that drops steeply toward the radius in the other direction.

8. Device according to claim 7, wherein
a tooth trough is provided in the blocking ring, between the front of one of the teeth and the rising ridge of the next tooth, and said trough has a constant radius.

* * * * *